US012480339B2

(12) United States Patent
Zhang et al.

(10) Patent No.: US 12,480,339 B2
(45) Date of Patent: Nov. 25, 2025

(54) RETRACTABLE CHILDPROOF LOCK

(71) Applicant: Ningbo Eudemon Child Protective Equipment Co., Ltd., Zhejiang (CN)

(72) Inventors: Zhen Zhang, Zhejiang (CN); Yingfeng Chen, Zhejiang (CN)

( * ) Notice: Subject to any disclaimer, the term of this patent is extended or adjusted under 35 U.S.C. 154(b) by 257 days.

(21) Appl. No.: 18/351,966

(22) Filed: Jul. 13, 2023

(65) Prior Publication Data

US 2023/0358078 A1 Nov. 9, 2023

(30) Foreign Application Priority Data

Apr. 17, 2023 (CN) ......................... 202320918682.9

(51) Int. Cl.
*E05B 65/00* (2006.01)
*E05B 17/22* (2006.01)
*F24C 15/02* (2006.01)

(52) U.S. Cl.
CPC .......... *E05B 65/0014* (2013.01); *E05B 17/22* (2013.01); *F24C 15/022* (2013.01)

(58) Field of Classification Search
CPC .... E05B 65/0014; E05B 1/0038; E05C 19/18; E05C 19/003; E05C 3/162; E05C 9/041; E05C 19/188
USPC ................................. 292/288, 289, DIG. 37
See application file for complete search history.

(56) References Cited

U.S. PATENT DOCUMENTS

| | | | | |
|---|---|---|---|---|
| 3,384,406 A * | 5/1968 | Welch | E05B 65/0014 | 292/54 |
| 5,230,541 A * | 7/1993 | Nowak | E05C 19/18 | 292/307 R |
| 5,285,596 A * | 2/1994 | Kinsey | E05F 1/16 | 49/404 |
| 6,099,047 A * | 8/2000 | Reiff | E05B 5/003 | 292/87 |
| 8,100,443 B2 * | 1/2012 | Talpe | E05B 13/005 | 70/214 |
| 8,967,019 B2 * | 3/2015 | O'Keefe | B60K 35/10 | 74/548 |
| 9,188,408 B2 * | 11/2015 | Huynh | F41G 1/22 | |
| 9,938,757 B2 * | 4/2018 | Raffi | E05C 19/188 | |
| 11,434,665 B2 * | 9/2022 | Andersen | E05B 65/46 | |
| 11,746,577 B2 * | 9/2023 | Chen | E05C 3/162 | 292/57 |

(Continued)

FOREIGN PATENT DOCUMENTS

| | | |
|---|---|---|
| CN | 109589007 A | 4/2019 |
| CN | 213627078 U | 7/2021 |

(Continued)

*Primary Examiner* — Christine M Mills
*Assistant Examiner* — Faria F Ahmad

(57) ABSTRACT

The disclosure provides a retractable childproof lock. The lock includes a lock body and a lock tongue arranged in a mode of retractable movements, so as to achieve objectives of locking or unlocking through retractable movements of the lock tongue. When being locked, the lock tongue is extended relative to the lock body, so that a locking end approaches relative to a first surface of the lock body in a first direction, but moves away from relative to a second surface of the lock body in a second direction, in such a way, an outward-opening moving part of a household product is locked due to blocking of the front end of the extending lock tongue.

19 Claims, 4 Drawing Sheets

(56) References Cited

U.S. PATENT DOCUMENTS

| | | | | |
|---|---|---|---|---|
| 2006/0076787 | A1 * | 4/2006 | Sundberg | E05B 65/0014 292/336.3 |
| 2008/0197642 | A1 * | 8/2008 | Talpe | E05B 13/005 292/336.3 |
| 2016/0168892 | A1 * | 6/2016 | Raffi | E05C 19/188 292/325 |
| 2018/0347236 | A1 * | 12/2018 | Smith | E05C 17/525 |
| 2019/0257121 | A1 * | 8/2019 | Tubby | E05B 65/5223 |
| 2022/0205292 | A1 | 6/2022 | Chen et al. | |
| 2022/0381064 | A1 | 12/2022 | Bar Shimon et al. | |
| 2023/0295960 | A1 * | 9/2023 | Andersen | E05B 65/0014 292/248 |
| 2024/0376757 | A1 * | 11/2024 | Lin | E05C 17/02 |

FOREIGN PATENT DOCUMENTS

| | | | | | |
|---|---|---|---|---|---|
| GB | 1335414 | A | * | 10/1973 | E05B 65/0014 |
| GB | 2327456 | A | * | 1/1999 | E05B 65/0014 |

* cited by examiner

RETRACTABLE CHILDPROOF LOCK

TECHNICAL FIELD

The disclosure pertains to the field of household protective products, and specifically pertains to a retractable childproof lock.

BACKGROUND

An oven is a small household appliance for roasting food. During working, the oven will generate high temperature inside. Therefore, when a child opens an oven door during use and before completely cooling down after use, he/she is likely to be scalded by high temperature, which is undesirable for his/her guardians. In addition to the above danger of scald, the child is likely to touch the food when opening the oven door, such that the food may be contaminated or fingers of the child may be pinched by the oven door.

Aiming at the above problems, some oven manufacturers have changed the locking structure of the oven door to prevent the same from being opened by children, such as a "Door Lock Assembly and Oven" described in the Chinese invention patent with No. CN109589007A, which, however, has two shortcomings, namely, the cost of equipment is high, and the equipment cannot be applied on a large scale; and the safety of the existing ovens cannot be addressed.

The oven door is generally arranged in an outward opening way, therefore, it can also be locked with an additional childproof lock, so as to solve the above problems, such as a "Childproof Lock" described in the Chinese utility model patent with No. CN213627078U. However, no safety lock available at present is specifically designed for an opening form of the oven door, and the existing safety locks feature complicated operation and inconvenient to use.

Therefore, it is necessary to develop a novel childproof lock capable of locking movable parts of household products represented by oven doors.

SUMMARY

The disclosure aims to provide a retractable childproof lock which is simple to operate and convenient to use.

As a first aspect of the disclosure, a retractable childproof lock is provided, including:

- a lock body, where the lock body has a first surface and a second surface;
- a lock tongue, where the lock tongue is arranged in a mode of retractable movements relative to the lock body, and a locking end is arranged at the front end of the lock tongue; and
- the first surface is used to form a fixed surface, and the second surface is used to form a base surface for retractable movements of the lock tongue; the lock tongue is extended relative to the lock body, so that the locking end simultaneously approaches in a first direction relative to the first surface but moves away from in a second direction relative to the second surface, thereby forming a locking state.

As a second aspect of the disclosure, a retractable childproof lock is provided, including:

- a lock body, where the lock body has a first surface and a second surface, and the second surface is perpendicular to the first surface;
- a lock tongue, where the lock tongue is arranged in a mode of retractable movements relative to the lock body, and a locking end is arranged at the front end of the lock tongue;

- the lock tongue is extended relative to the lock body, so that the locking end simultaneously approaches in a first direction relative to the first surface but moves away from in a second direction relative to the second surface, thereby forming a locking state; and
- the lock tongue is movably arranged in a mode of retractable movements relative to the lock body along an arc trajectory for locking or unlocking.

As a third aspect of the disclosure, a retractable childproof lock is provided, including:

- a lock body, where the lock body has a first surface and a second surface;
- a lock tongue, where the lock tongue is movably arranged in a mode of retractable movements relative to the lock body, a locking end is arranged at the front end of the lock tongue, and the lock tongue is arranged in a mode of retractable movements relative to the lock body along an arc trajectory for locking or unlocking; and
- a locking mechanism, where the locking mechanism is used to lock a retraction displacement of the lock tongue to keep the lock tongue in a locking state until an unlocking state is formed by an unlocking operation.

Specifically, the first surface is formed by the bottom surface of the lock body, and the second surface is formed by the lower end surface of the lock body.

The lock tongue is extended relative to the lock body, so that the locking end simultaneously approaches in a first direction relative to the first surface but moves away from in a second direction relative to the second surface, thereby forming the locking state.

A second locking engagement member is arranged in a length direction of the lock tongue, a locking member is arranged in a movable mode and is provided with a first locking engagement member, a first locking structure and a second locking structure arranged in a mode of concave-convex engagement are separately formed on the first locking engagement member and the second locking engagement member, and the first locking structure and the second locking structure constitute the locking mechanism.

The locking member is displaced, so that the first locking engagement member and the second locking engagement member are engaged with each other to lock the retracting displacement of the lock tongue to keep the lock tongue in a locking state; and the locking member is displaced, so that the first locking engagement member is separated from the second locking engagement member to release its locking of the lock tongue, thereby allowing the lock tongue to switch between locking state and unlocking state.

Beneficial effects of the retractable childproof lock in the disclosure include:

1. The childproof lock of the disclosure is a single component as a whole. Therefore, to lock and use the lock, it is only necessary to consider relative positional relationship between the single component and a household product (such as an oven) to be locked, compared with a safety lock consisting of a plurality of parts requiring cooperation with one another, the lock of the disclosure is more convenient for installation and use.

2. The lock tongue moves reciprocally along the arc or straight-line trajectory, and can be locked or unlocked by pushing and pulling the lock tongue, which is convenient to operate.

3. The locking process of the lock tongue can be achieved by directly pushing the lock tongue, and the unlocking of the lock tongue can be achieved by pushing and pulling the lock tongue while keeping pressing the unlocking member, that is, one-way locking is achieved. Of course, Of course, the locking and unlocking of the lock tongue can be achieved by pushing and pulling the lock tongue while keeping pressing the unlocking member.

4. The extending degree of the lock tongue can be adjusted as needed, and a vertical distance between the locking end at the front end of the lock tongue and the first surface can be adjusted through its different extending portion of the lock tongue, so that it can adapt to different ovens, or allow the oven door to be slightly opened.

5. In addition to being suitable for the protection of oven doors, the childproof lock of the disclosure can also be applied to other household products with outward-opening moving parts, such as cabinet doors, drawers, and the like.

Figure 1A:
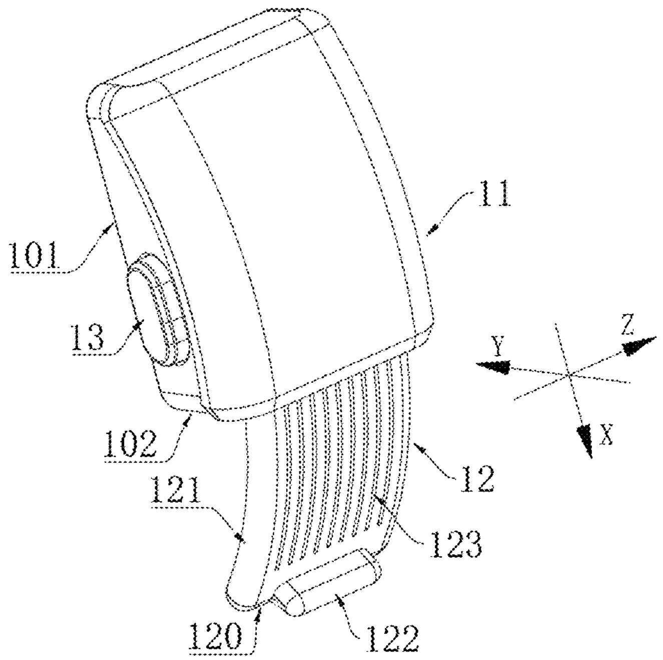
FIG. 1*a* is structural schematic diagram of an oven lock in a locking state according to an embodiment of the disclosure.

In the accompanying drawings, lock body 11, lock tongue 12, unlocking member 13, locking member 14, first surface 101, second surface 102, locking cavity 110, first lock body 111, second lock body 112, unlocking member hole 114, locking end 120, lock tongue body 121, hand pushing block 122, bar-shaped portion 123, second locking engagement member 124, first locking engagement cavity 125, first locking tooth part 1251, first locking tooth surface 1252, second locking tooth surface 1253, operating part 130, first acting part 131, actuating surface 140, locking body 141, first locking engagement member 142, second locking tooth part 143, third locking tooth surface 1431, and fourth locking tooth surface 1432.

DESCRIPTION OF THE EMBODIMENTS

Specific implementation of the disclosure will be described in detail below in conjunction with particular embodiments.

A retractable childproof lock, the lock has a first surface 101 for contacting onto a surface of a household product for fixing, for example, the first surface 101 is fixed at an appropriate position of a household product (such as small household appliances, cabinets, and the like) by means of gluing, and the like, such that a movable part (such as doors or drawers) of the household product can be locked.

In this embodiment, the childproof lock is fixed on an oven as an oven lock for locking an oven door to prevent the oven door from being opened by children, so as to prevent the children from damaging or contaminating food or causing self-injury. In other embodiments, the childproof lock can also be incorporated into other household products with doors or drawers that are opened outwards.

Figure 1B:
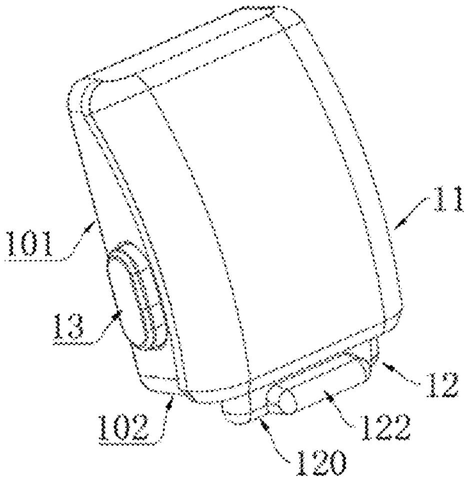
FIG. 1*b* is a structural schematic diagram of the oven lock in a unlock state of the embodiment in FIG. 1*a;*

As shown in FIGS. 1*a*-1*b*, the childproof lock has a lock body 11 and a lock tongue 12 movably arranged on the lock body 11 along an arc-shaped trajectory, where the first surface 101 is formed on a surface (such as the bottom surface) of the lock body 11, the first surface 101 is used as a fixed surface of the lock body 11, and the other surface (such as the lower end surface) of the lock body 11 is formed as a second surface 102, which is used to form a base surface for retractable movements of the lock tongue 12. Therefore, a locking state, as shown in FIG. 1*a*, is formed by making the lock tongue 12 extended relative to the second surface 102 of the lock body 11, so that a locking end 120 at an appropriate position at the front end of the lock tongue 12 approaches in a first direction relative to the first surface 101, and the locking end 120 moves away from in a second direction relative to the second surface 102. Of course, when the lock tongue 12 is retracted in a direction opposite the above direction, an unlocking state, as shown in FIG. 1*b*, can be formed. A reference coordinate system is established in FIG. 1*a*, where the first surface 101 is located on the X-Z plane, the second surface 102 is located on the Y-Z plane, the two surfaces are perpendicular to each other, the first direction is the Y-axis direction, and the second direction is the X-axis direction. Of course, in other embodiments, the second surface 102 can also be other planes, that is, different from the first surface 101, and the reference coordinate system is still set relative to the first surface 101, so that the first direction and the second direction can remain unchanged.

In this embodiment, the lock tongue 12 is arc-shaped in its length direction and arranged on the lock body 11 along an arc trajectory corresponding to its own shape, so that the front end of the lock tongue 12 is close to a plane relative to the plane where the first surface is located in the Y-axis direction through the retractable movements of the lock tongue 12, thereby playing a locking role. Of course, in other embodiments, the lock tongue 12 can also be of a straight shape in its length direction, but in this case, the retractable trajectory of the lock tongue 12 needs to be arranged to be inclined towards its extending direction, so that the retractable movements of the lock tongue 12 relative to the lock body 11 can similarly make the front end of the lock tongue 12 approach in the Y-axis direction to play a locking role.

As shown in FIG. 1*a*, the lock tongue 12 includes an arc-shaped lock tongue body 121 in its length direction, and the locking end 120 is formed on the front end of the lock tongue body 121 for extending to be propped against a surface of a movable part of the household product and locking the movable part. Further, a hand pushing block 122 is arranged on an outer surface of the lock tongue 12 to facilitate a user to push or pull the lock tongue 12, so that the lock tongue can complete the retractable movements along the arc track, and the hand pushing block 122 can also play a role in limiting the retracting stroke of the lock tongue 12, that is, being propped against the track mouth at the lower end of the lock body 11 for limiting. Bar-shaped portions 123 are arranged on an upper surface of the lock tongue body 121 in its length direction, and the bar-shaped portions 123 can be protruding ridges or grooved bars to play a role of structural reinforcement or material reduction.

Figure 2:
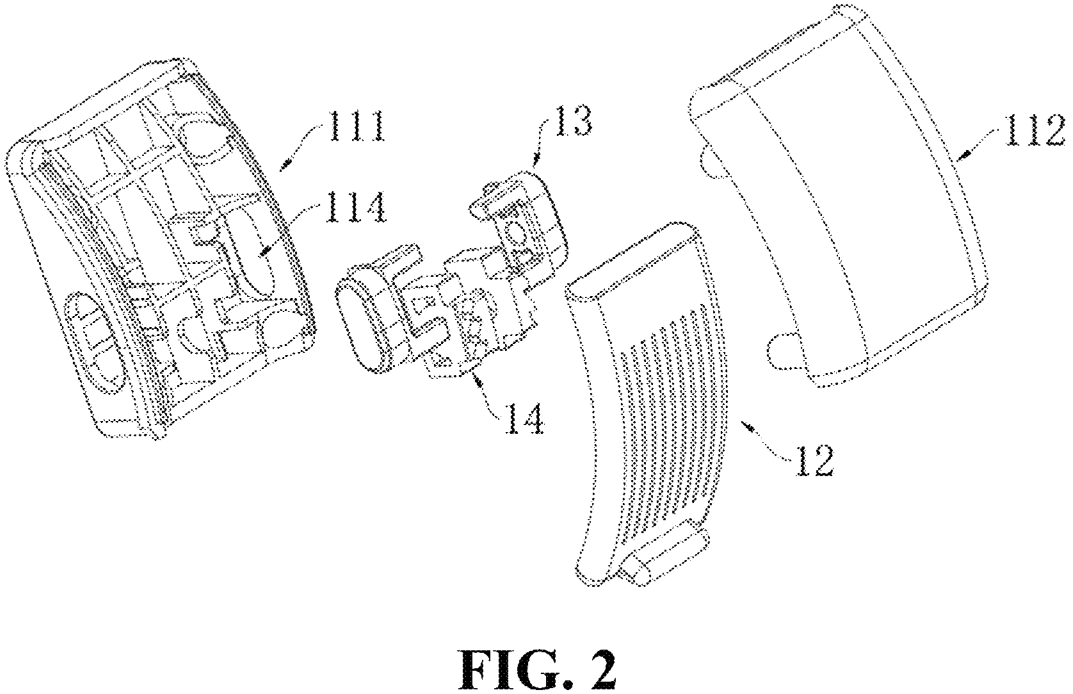
FIG. 2 is a structural exploded view of the embodiment in FIG. 1*a;*
Figure 3:
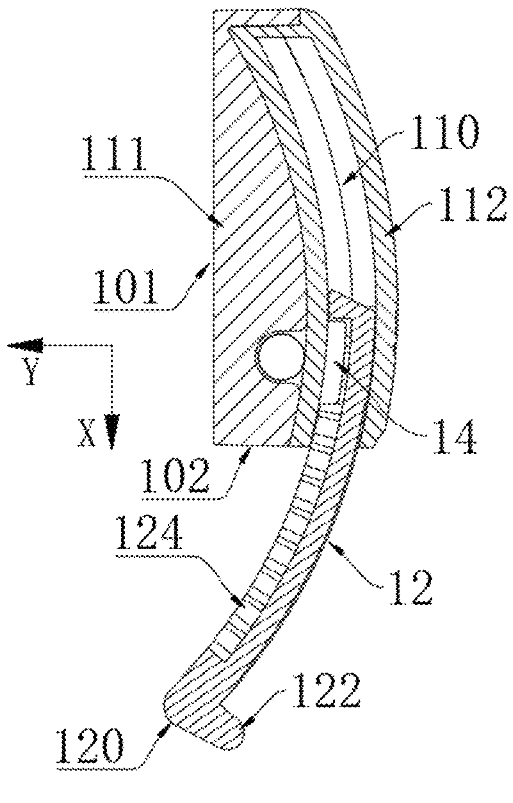
FIG. 3 is a structural schematic diagram of a sectional view of the embodiment in FIG. 1*a;*

As shown in FIG. 2, the lock body 11 includes a first lock body 111 and a second lock body 112 that are connected to each other, and they are connected by known methods, such as engagement, screw connection, and hot melt connection, to form the lock body 11; further, a lock cavity 110 is formed between the first lock body 111 and the second lock body 112, and at least a portion of an unlocking member 13 and a locking member 14 are arranged inside the lock cavity to lock the retractable movements of the lock tongue 12 at a certain position within the stroke of its retractable movements. The unlocking member 13 fits in with the locking member 14 to form a locking mechanism for acting on the lock tongue 12 to lock it at a predetermined position.

In this embodiment, the unlocking member 13 is arranged in a mode of reciprocating retractable movements, and the user can press to drive the unlocking member 13 to realize locking or unlocking. The locking member 14 is also reciprocally arranged inside the locking cavity 110, and its displacement direction is basically perpendicular to the movement direction of the lock tongue 12, so that the locking member 14 can be firmly locked on the lock tongue 12, and the locking member 14 is driven by the unlocking member 13 to conduct reciprocating activities to realize locking or unlocking. A first locking engagement member 142 is arranged on the locking member 14, and a second locking engagement member 124 is correspondingly arranged on the lock tongue 12. When the first locking engagement member 142 and the second locking engagement member 124 are engaged with each other, the retractable displacement movements of the lock tongue 12 are locked. When the first locking engagement member 142 is separated from the second engagement member 124, the lock tongue 12 is capable of performing the retractable displacement movements.

Figure 4:
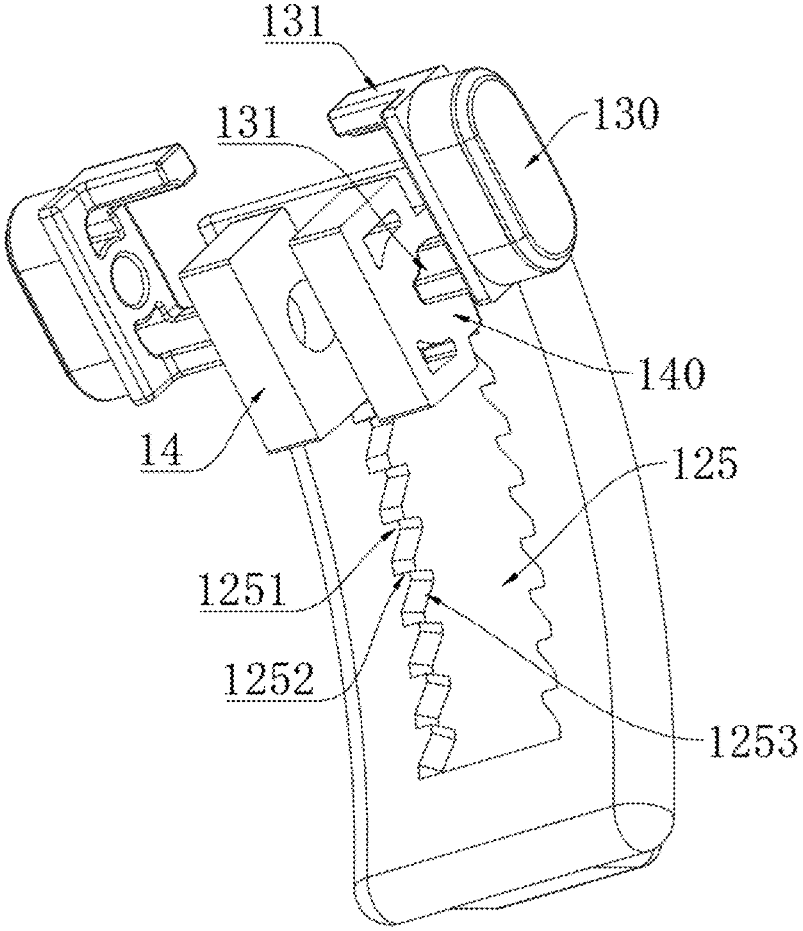
FIG. 4 is a schematic diagram of cooperation between a lock tongue and a locking structure of the embodiment in FIG. 1*a*.
Figure 5:
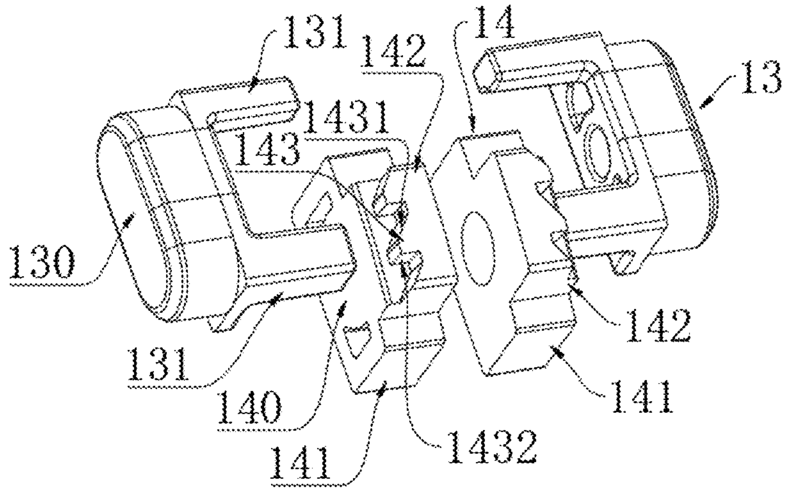
FIG. 5 is a structural schematic diagram of the locking structure in FIG. 4.

As shown in FIGS. 4 and 5, in this embodiment, the second locking engagement member 124 consists of a first locking engagement cavity 125 recessed on the back of the lock tongue 12 and arranged in its length direction and a first locking tooth part 1251 arranged on two sides of the first locking engagement cavity 125. The first locking tooth part 1251 is a toothed rack, including a plurality of tooth parts, each tooth part includes a first locking tooth surface 1252 and a second locking tooth surface 1253, where the first locking tooth surface 1252 is a plane for forming a locking engagement, and the second locking tooth surface 1253 is an inclined surface for forming a guiding surface to facilitate a guiding fit (as shown in FIG. 4, the first locking tooth surface 1252 is perpendicular to the length direction of the lock tongue 12, while the second locking tooth surface 1253 is inclined to the length direction of the lock tongue 12). The first locking engagement member 142 is formed by a second locking tooth part 143 arranged on the locking member 14 in a protrusive mode. The second locking tooth part 143 includes a plurality of toothed blocks, each toothed block includes a third locking tooth surface 1431 and a fourth locking tooth surface 1432, where the third locking tooth surface 1431 is a plane for forming a locking engagement, the fourth locking tooth surface 1432 is an inclined surface for forming a guiding surface to facilitate a guiding fit, the third locking tooth surface 1431 fits in with the first locking tooth surface 1252, and the fourth locking tooth surface 1432 fits in with the second locking tooth surface 1253.

When the lock tongue 12 is retracted and displayed, the third locking tooth surface 1431 and the first locking tooth surface 1252 make the locking tongue 14 being limited by the locking member 12 to realize the locking of the lock tongue 12 (when the unlocking member 13 is pressed, the third locking tooth surface 1431 can be driven to separate from the first locking tooth surface 1252 with the retractable displacement of the locking member 14, and the locking is then released); when the lock tongue 12 is extended and displaced, the fourth locking tooth surface 1432 interacts with the second locking tooth surface 1253 to make the locking member 14 move in its second retractable displacement direction to fit into the next tooth part, thus allowing the protrusion of the locking tongue 12. Therefore, in this embodiment, the lock tongue 12 is locked in a single direction due to the guiding fit between the fourth locking tooth surface 1432 and the second locking tooth surface 1253. Of course, when there is only one guiding portion, the guiling role thereof can also be achieved, and the guiding surfaces can also be a curved surface.

Of course, in other embodiments, when the guiding surfaces of the tooth parts and the toothed blocks are canceled at the same time, a two-way locking engagement relationship can be formed, that is, both the protrusion and retraction of the lock tongue 12 need to be unlocked under the condition that the unlocking member 13 drives the locking member 14 to move in its retractable displacement direction. Alternatively, it is also feasible to arrange the first locking tooth part 1251 on one side of the first locking engagement cavity 125 only, but such arrangement could lead to a weakening of the locking strength.

As shown in FIG. 5, the unlocking member 13 includes an operating parts 130 for being at least partially exposed to an unlocking member hole 114 of the lock body 11, and first acting parts 131 integrally formed with the operating part 130, where there are two first acting parts 131 that are arranged in parallel at intervals. The locking member 14 includes a locking body 141 and the first locking engagement member 142 integrally formed with the lock body, the second locking tooth part 143 is formed on an outer side of the first locking engagement member 142 to fit in with the first locking tooth part 1251. Further, the unlocking member 13 and the locking member 14 are separately composed of two, so as to form two sets of unlocking mechanism oppositely arranged. The line connection direction of the two locking members 14 is called the retractable displacement direction of the locking member 14, and the two directions are basically perpendicular. When the unlocking member 13 is pressed inwards, the front end of the first acting part 131 can act on an actuating surface 140 on the outer end surface of the locking body 141, so that the locking member 14 is driven to move inwards to release the locking of the lock tongue 12.

In this embodiment, a reset spring (not shown in the drawings) is arranged between the two locking members 14 to make the locking members 14 keep in contact with the first locking tooth part 1251.

What is claimed is:

1. A retractable childproof lock, comprising:

a lock body, and the lock body has a first surface and a second surface; and a lock tongue, wherein the lock tongue is arranged in a mode of retractable movements relative to the lock body, and a locking end is arranged at a front end of the lock tongue;

wherein the first surface is used to form a fixed surface, and the second surface is used to form a base surface for retractable movements of the lock tongue; when the lock tongue extends relative to the lock body, the locking end approaches, in a first direction, toward the plane where the first surface is located, while simultaneously moving away, in a second direction, from the plane where the second surface is located, thereby forming a locking state; and the lock tongue is movably arranged in a mode of retractable movements relative to the lock body along an arc trajectory or an oblique straight-line trajectory for locking or unlocking.

2. The retractable childproof lock according to claim 1, wherein the lock further comprises a locking mechanism for locking retraction displacement of the lock tongue to keep the lock tongue in a locking state, and the locking mechanism comprises a first locking structure and a second locking structure; a second locking engagement member is arranged in a length direction of the lock tongue, a locking member is arranged in a movable mode and is provided with a first locking engagement member, and a first locking structure and a second locking structure arranged in a mode of concave-convex engagement are separately formed on the first locking engagement member and the second locking engagement member; and the locking member is displaced, so that the first locking engagement member and the second locking engagement member are engaged with each other to lock the retracting displacement of the lock tongue, thereby forming a locking state; and the locking member is displaced, so that the first locking engagement member is separated from the second locking engagement member to release the locking of the lock tongue, thereby forming an unlocking state.

3. The retractable childproof lock according to claim 2, wherein the first locking structure and the second locking structure are respectively toothed blocks and toothed racks, the toothed racks are arranged on back of the lock tongue in a length direction of the lock tongue or arranged on one side surface of recessed bar holes along back side of the lock tongue, and the locking member is arranged in a mode of retractable movements in such a way that can approach or move away from the toothed racks.

4. The retractable childproof lock according to claim 3, wherein a first locking engagement cavity is formed on the back side of the lock tongue, a first locking tooth part is arranged on at least one side of the first locking engagement cavity, the first locking tooth part is toothed racks, and the second locking engagement member is formed by the first locking tooth part; the locking member is provided with a second locking tooth part, the second locking tooth part comprises a plurality of toothed blocks for locking or unlocking in such a way that the locking member moves away from to be separated from the first locking tooth part, or approaches to be engaged with first locking tooth part.

5. The retractable childproof lock according to claim 4, wherein the first locking engagement cavity is a bar-shaped groove recessed on but not penetrating through the back of the lock tongue, the first locking tooth part is arranged on a side wall of the bar-shaped groove, the second locking tooth part is arranged on an outer side of the locking member, and the locking member is arranged in a movable mode in a width direction of the lock tongue.

6. The retractable childproof lock according to claim 5, wherein the second locking tooth part comprises a plurality of toothed blocks, each toothed block has a third locking tooth surface and a fourth locking tooth surface, the third locking tooth surface is a plane for forming a locking engagement, and the fourth locking tooth surface is an inclined surface for forming a guiding fit.

7. The retractable childproof lock according to claim 6, wherein the first locking tooth part comprises a first locking tooth surface and a second locking tooth surface, the first locking tooth surface is a plane for forming a locking engagement with the third locking tooth surface, and the second locking tooth surface is an inclined surface or a curved surface for forming a guiding fit with the fourth locking tooth surface.

8. The retractable childproof lock according to claim 2, wherein the lock body comprises a first lock body and a second lock body that are connected to each other.

9. The retractable childproof lock according to claim 8, wherein the locking end is formed by the front end of the lock tongue; and the childproof lock is then formed as an oven lock.

10. The retractable childproof lock according to claim 8, wherein the second surface is perpendicular to the first surface, and the second surface is formed by a lower end surface of the lock body; and a lock cavity for accommodating the locking member is formed between the first lock body and the second lock body; an unlocking member is arranged on one side of the lock cavity in a movable mode for pushing movements of the locking member; and a reset spring acts on the locking member to make the locking member keep in contact with a first locking tooth part.

11. A retractable childproof lock, comprising:

a lock body, wherein the lock body has a first surface and a second surface, and the second surface is perpendicular to the first surface;

a lock tongue, wherein the lock tongue is movably arranged in a mode of retractable movements relative to the lock body, and a locking end is arranged at the front end of the lock tongue;

wherein when the lock tongue extends relative to the lock body, the locking end approaches, in a first direction, toward the plane where the first surface is located, while simultaneously moving away, in a second direction, from the plane where the second surface is located, thereby forming a locking state; and the lock tongue is arranged in a mode of retractable movements relative to the lock body along an arc trajectory for locking or unlocking.

12. The retractable childproof lock according to claim 11, wherein the childproof lock further comprises a locking mechanism for locking retraction displacement of the lock tongue;

wherein a second locking engagement member is arranged in a length direction of the lock tongue, the locking members are arranged in a movable mode and each is provided with a first locking engagement member, a first locking structure and a second locking structure arranged in a mode of concave-convex engagement are separately formed on the first locking engagement member and the second locking engagement member, and the first locking structure and the second locking structure are formed as the locking mechanism; the locking member is displaced, so that the first locking engagement member and the second locking engagement member are engaged with each other to lock the retracting displacement of the lock tongue, thereby forming a locking state; and the locking member is displaced, so that the first locking engagement member is separated from the second locking engagement member to release the locking of the lock tongue, thereby forming an unlocking state; and the first locking structure and the second locking structure are respectively toothed blocks and toothed racks, the toothed racks are arranged on back of the lock tongue in a length direction of the lock tongue or arranged on one side surface of recessed bar holes along the back side of the lock tongue, and the locking member is arranged in a mode of retractable movements in such a way that can approach or move away from the toothed racks.

13. The retractable childproof lock according to claim 12, wherein a first locking engagement cavity is formed on the back side of the lock tongue, a first locking tooth part is arranged at least one side of the first locking engagement cavity, the first locking tooth part is toothed racks, and the second locking engagement member is formed by the first locking tooth part; the locking member is provided with a second locking tooth part, the second locking tooth part comprises a plurality of toothed blocks for locking or unlocking in such a way that the locking member moves away from to be separated from the first locking tooth part, or approaches to be engaged with first locking tooth part.

14. The retractable childproof lock according to claim 13, wherein the first locking engagement cavity is a bar-shaped groove recessed on but not penetrating through the back of the lock tongue, the first locking tooth part is arranged on a side wall of the bar-shaped groove, the second locking tooth part is arranged on an outer side of the locking member, and the locking member is arranged in a movable mode in a width direction of the lock tongue;

the second locking tooth part comprises a plurality of toothed blocks, each toothed block has a third locking tooth surface and a fourth locking tooth surface, the third locking tooth surface is a plane for forming a locking engagement, and the fourth locking tooth surface is an inclined surface for forming a guiding fit; and The first locking tooth part comprises a first locking tooth surface and a second locking tooth surface, the first locking tooth surface is a plane for forming a locking engagement, and the second locking tooth surface is an inclined surface or a curved surface for forming a guiding fit.

15. The retractable childproof lock according to claim 13, wherein the lock body comprises a first lock body and a second lock body that are connected to each other, and the locking end is formed by the front end of the lock tongue;

a lock cavity for accommodating the locking member is formed between the first lock body and the second lock body; an unlocking member is arranged on one side of the lock cavity in a movable mode for pushing movements of the locking member; and a reset spring acts on the locking member to make the locking member keep in contact with the first locking tooth part, and the childproof lock is formed as an oven lock.

16. A retractable childproof lock, comprising:

a lock body, wherein the lock body has a first surface and a second surface;

a lock tongue, wherein the lock tongue is arranged in a mode of retractable movements relative to the lock body, a locking end is arranged at the front end of the lock tongue, and the lock tongue is movably arranged in a mode of retractable movements relative to the lock body along an arc trajectory for locking or unlocking; and a locking mechanism, wherein the locking mechanism is used to lock a retraction displacement of the lock tongue to keep the lock tongue in a locking state until an unlocking state is formed by an unlocking operation;

wherein the first surface is formed by the bottom surface of the lock body, and the second surface is formed by the lower end surface of the lock body;

when the lock tongue extends relative to the lock body, the locking end approaches, in a first direction, toward the plane where the first surface is located, while simultaneously moving away, in a second direction, from the plane where the second surface is located, thereby forming the locking state;

a second locking engagement member is arranged in a length direction of the lock tongue, the locking members are arranged in a movable mode and each is provided with a first locking engagement member, a first locking structure and a second locking structure arranged in a mode of concave-convex engagement are separately formed on the first locking engagement member and the second locking engagement member, and the first locking structure and the second locking structure constitute the locking mechanism; and the locking member is displaced, so that the first locking engagement member and the second locking engagement member are engaged with each other to lock the retracting displacement of the lock tongue to keep the lock tongue in a locking state; and the locking member is displaced, so that the first locking engagement member is separated from the second locking engagement member to release its locking of the lock tongue, thereby allowing the lock tongue to switch between locking state and unlocking state.

17. The retractable childproof lock according to claim 16, wherein the first locking structure and the second locking structure are respectively toothed blocks and toothed racks, the toothed racks are arranged on back of the lock tongue in a length direction of the lock tongue or arranged on one side surface of recessed bar holes along the back side of the lock tongue, and the locking member is arranged in a mode of retractable movements in such a way that can approach or move away from the toothed racks; and a first locking engagement cavity is formed on the back side of the lock tongue, a first locking tooth part is arranged at least one side of the first locking engagement cavity, the first locking tooth part is toothed racks, and the second locking engagement member is formed by the first locking tooth part; the locking member is provided with a second locking tooth part, the second locking tooth part comprises a plurality of toothed blocks for locking or unlocking in such a way that the locking member moves away from to be separated from the first locking tooth part, or approaches to be engaged with first locking tooth part.

18. The retractable childproof lock according to claim 17, wherein the first locking engagement cavity is a bar-shaped groove recessed on but not penetrating through the back of the lock tongue, the first locking tooth part is arranged on a side wall of the bar-shaped groove, the second locking tooth part is arranged on an outer side of the locking member, and the locking member is arranged in a movable mode in a width direction of the lock tongue; and the second locking tooth part comprises a plurality of toothed blocks, each toothed block has a third locking tooth surface and a fourth locking tooth surface, the third locking tooth surface is a plane for forming a locking engagement, and the fourth locking tooth surface is an inclined surface for forming a guiding fit.

19. The retractable childproof lock according to claim 18, wherein the first locking tooth part comprises a first locking tooth surface and a second locking tooth surface, the first locking tooth surface is a plane for forming a locking engagement, and the second locking tooth surface is an inclined surface or a curved surface for forming a guiding fit;

the lock body comprises a first lock body and a second lock body that are connected to each other, a lock cavity for accommodating the locking member is formed between the first lock body and the second lock body; an unlocking member is arranged on one side of the lock cavity in a movable mode for pushing movements of the locking member; and the second surface is perpendicular to the first surface, a reset spring acts on the locking member to make the locking member keep in contact with the first locking tooth part, and the childproof lock is formed as an oven lock.

* * * * *